United States Patent
Joshi et al.

(10) Patent No.: US 10,177,965 B1
(45) Date of Patent: Jan. 8, 2019

(54) LIVE MEDIA ENCODING FAILOVER SYSTEM

(71) Applicant: Amazon Technologies, Inc., Seattle, WA (US)

(72) Inventors: Varad Joshi, Portland, OR (US); Eric Woodruff, Beaverton, OR (US); Kristopher Kosmatka, Portland, OR (US); Trevor Babcock, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 15/348,360

(22) Filed: Nov. 10, 2016

(51) Int. Cl.
| | |
|---|---|
| *G06F 15/16* | (2006.01) |
| *H04L 12/24* | (2006.01) |
| *H04L 12/911* | (2013.01) |
| *H04L 29/06* | (2006.01) |
| *H04L 12/26* | (2006.01) |
| *H04L 12/823* | (2013.01) |
| *H04L 29/08* | (2006.01) |

(52) U.S. Cl.
CPC ...... *H04L 41/0668* (2013.01); *H04L 41/0846* (2013.01); *H04L 43/0811* (2013.01); *H04L 47/32* (2013.01); *H04L 47/746* (2013.01); *H04L 65/4069* (2013.01); *H04L 65/607* (2013.01); *H04L 67/141* (2013.01)

(58) Field of Classification Search
USPC ....... 709/203, 206, 217, 219, 223, 224, 226, 709/228, 230, 232, 238; 717/171; 370/216, 474
See application file for complete search history.

(56) References Cited

U.S. PATENT DOCUMENTS

| | | | | | |
|---|---|---|---|---|---|
| 5,835,493 | A | * | 11/1998 | Magee | ............. H04N 21/23608 370/474 |
| 2006/0018254 | A1 | * | 1/2006 | Sanders | ............. H04N 21/2365 370/216 |
| 2011/0296473 | A1 | * | 12/2011 | Babic | ..................... H04N 21/21 709/224 |
| 2011/0296474 | A1 | * | 12/2011 | Babic | ..................... H04N 21/21 709/226 |
| 2014/0075425 | A1 | * | 3/2014 | Stevenson | ............... G06F 8/656 717/171 |

* cited by examiner

*Primary Examiner* — Quang N Nguyen
(74) *Attorney, Agent, or Firm* — Knobbe Martens Olson & Bear LLP

(57) ABSTRACT

An encoding system that distributes a live stream to end user devices is provided herein. The encoding system automatically detects failed components and implements a failover action to replace the failed component with a backup component in a manner that reduces live stream interruptions. For example, the encoding system can include a network interface that is coupled to an encoder allocated to a live stream. Instead of providing a contribution encoder that transmits the live stream with a location of the allocated encoder, the encoding system can provide the contribution encoder with a location of the network interface. Thus, the contribution encoder can transmit the live stream to the network interface. The network interface can then forward the live stream to the allocated encoder. If the allocated encoder fails, then the network interface can forward the live stream to a backup encoder.

20 Claims, 6 Drawing Sheets

LIVE MEDIA ENCODING FAILOVER SYSTEM

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying, or distributing streaming television or radio content. In other instances, these computing devices may serve to replicate or replace prior content distribution systems. For example, data centers can provide network-based streaming audio or video content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software is used to replace or replicate functionality of dedicated hardware devices. For example, software applications may be used to encode and package a data stream containing live video content, thus reducing or eliminating the need for dedicated hardware to perform these functions. Because of the flexibility of software-based solutions, a single computing device may be utilized to generate content for both traditional and network-based generation systems.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
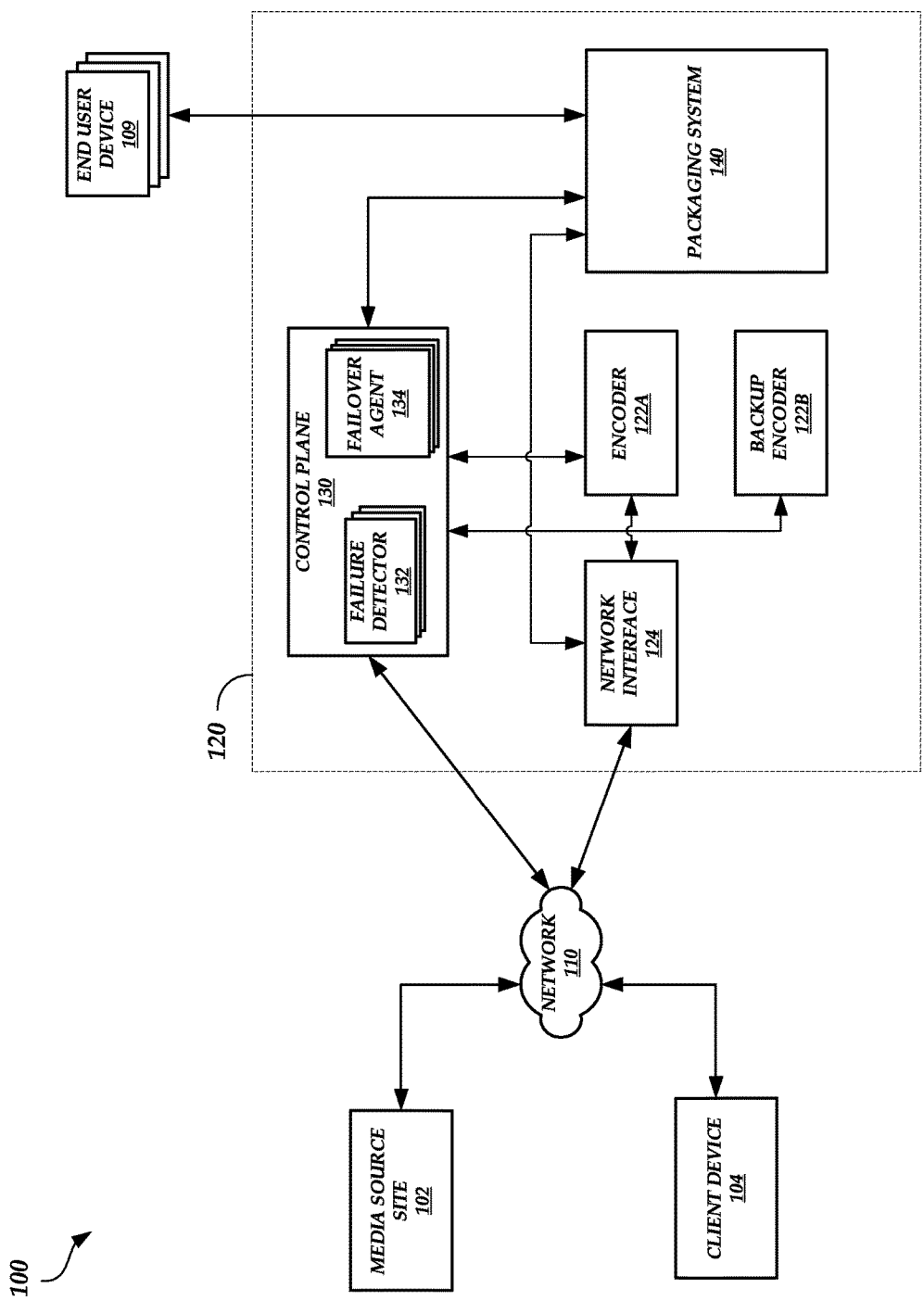
FIG. 1A is a block diagram of a live media encoding failover environment that includes a media source site, a client device, a live media encoding system, and end user devices, according to one embodiment.

Generally, an entity transmitting streaming data is required to set the parameters for transmitting the live stream to a central server. For example, the entity can operate a contribution encoder in which parameters, such as the codec, bitrate, image dimension, chroma subsampling, group of pictures (GOP) length, GOP structure, scan type, transport type, audio sampling rate, video frame rate, or forward error correction type, are set. The contribution encoder, which may be located at the site from which the live stream is captured, can transmit the live stream to the central server. As used herein, a live stream can include one or more data packets that include encoded media (e.g., video, audio, audio and video, etc.).

The central server may include several components, including encoders, packaging ingest devices, and packaging egress devices. One encoder, packaging ingest device, and packaging egress device may be allocated to a particular live stream. The allocated encoder may receive the transmitted live stream and forward the live stream to the allocated packaging ingest device. In some embodiments, before forwarding the live stream to the allocated packaging ingest device, the allocated encoder transcodes the live stream into a different format, bitrate, and/or the like. The packaging ingest device may not perform any transcoding. Instead, the packaging ingest device may repackage the live stream into a different transport protocol packaging standard, add digital rights management attributes to the live stream (e.g., attributes that restrict access to, modification of, and/or distribution of the live stream), and/or the like. The packaging ingest device may then store data segments corresponding to the live stream and metadata associated with the data segments. The packaging egress device can retrieve the data segments and/or metadata for distribution to end user devices.

In some cases, one or more of the encoder, the packaging ingest device, or the packaging egress device can fail. For example, the hardware of such components can malfunction or fail, a network interruption can occur, the components may need to be taken offline for maintenance, and/or the like. In such a situation, a backup encoder, packaging ingest device, or packaging egress device can take the place of the failed component.

However, switching to a backup component can cause an interruption in the transmission or storage of the live stream. For example, in conventional systems, the entity configures the contribution encoder with values for the parameters listed above and with a location (e.g., Internet protocol (IP) address, port, etc.) of the allocated encoder such that the contribution encoder can transmit the live stream to the appropriate location. If a backup encoder replaces a failed encoder, then the contribution encoder settings have to be updated with new parameter values and the location of the backup encoder so that the live stream can be redirected to the backup encoder. Notifying the entity that the allocated encoder failed and a backup encoder has taken the place of the failed encoder and providing the entity with the appropriate parameter values can be time-consuming, thereby interrupting the live stream transmission and degrading the end user experience.

Generally described, various embodiments disclosed herein provide an encoding system that automatically detects failed components and implements a failover action to replace the failed component with a backup component in a manner that reduces live stream interruptions. Illustratively, the encoding system can include a first network interface that is coupled to an encoder allocated to a live stream. Instead of providing the entity and/or the contribution encoder with a location of the allocated encoder and corresponding parameter values, the encoding system can provide the entity and/or the contribution encoder with a location of the first network interface and corresponding parameter values. Thus, the contribution encoder can transmit the live stream to the first network interface. The first network interface can then forward the live stream to the allocated encoder.

When receiving instructions to allocate computing resources for a live stream that will be starting, the encoding system can allocate the encoder and a backup encoder to the live stream. If the allocated encoder fails, then the encoding system can de-couple the first network interface from the allocated encoder and couple the first network interface to the backup encoder. Because the contribution encoder has already been configured to transmit the live stream to the first network interface, the encoding system does not have to provide the entity and/or the contribution encoder with any new parameter values or live stream destinations. The contribution encoder can continue to transmit the live stream to the first network interface and the encoding system can internally redirect the live stream to the appropriate encoder, thereby reducing live stream interruptions. In some embodiments, the encoding system allocates a new backup encoder to the live stream when the allocated encoder fails and the encoding system transitions to the backup encoder.

In addition, when receiving instructions to allocate computing resources for a live stream that will be starting, the encoding system can allocate to the live stream a second network interface, a load balancer, a packaging ingest device, and one or more packaging egress devices (e.g., a pool of packaging egress devices). The second network interface can be coupled to the allocated packaging ingest device and the load balancer can be coupled to one or more of the allocated packaging egress device(s). The first network interface and the second network interface can communicate such that the first network interface transmits the live stream received from the allocated encoder (e.g., after the allocated encoder transcodes the live stream) to the second network interface. The second network interface can then forward the received live stream to the allocated packaging ingest device. While no backup packaging ingest device may be allocated initially to the live stream, if the allocated packaging ingest device fails, then the encoding system can select a backup packaging ingest device from a pool of backup packaging ingest devices. The encoding system can then de-couple the second network interface from the allocated packaging ingest device and couple the second network interface to the selected backup packaging ingest device. Thus, the first network interface can continue to forward the live stream to the second network interface regardless of whether an allocated packaging ingest device has failed, thereby reducing live stream interruptions.

The allocated packaging egress device(s) can receive stored data segments and/or associated metadata from storage based on requests received by the load balancer from one or more end user devices. The allocated packaging egress device(s) may be in a pool of packaging egress devices and, if one of the allocated packaging egress devices fails, another packaging egress device in the pool can take over for the failed allocated packaging egress device. The encoding system can de-couple the load balancer from the failed packaging egress device and couple the load balancer to the new packaging egress device. Thus, the first and second network interfaces and/or the load balancer can serve as a known, fixed endpoint to which data can be transmitted regardless of whether a component in the encoding system has failed.

Furthermore, the encoding system may implement a gossip protocol to detect when a component has failed or is about to fail. For example, each component (e.g., the encoders, packaging ingest devices, and packaging egress devices) can run an agent (referred to herein as a failure detector). In addition, the control plane of the encoding system can run a plurality of agents, at least one for each type of component. Each encoder agent may be configured to periodically transmit a communication to a random selection of other encoder agents, each packaging ingest device agent may be configured to periodically transmit a communication to a random selection of other packaging ingest device agents, and each packaging egress device agent may be configured to periodically transmit a communication to a random selection of other packaging egress device agents. In response to transmitting the communication, the agent may expect to receive a response (e.g., an acknowledgement). If the agent does not receive a response within a threshold period of time (e.g., which can be the same or different for individual types of components), then the agent determines that the component to which the communication was transmitted has failed or is about to fail. The agent may then transmit this determination to one or more other agents, and the determination can be propagated to various component agents until the determination reaches a control plane agent. Upon receiving the determination, the control plane can reallocate computing resources to reduce live stream interruptions as described herein. Additional details and embodiments of the encoding system are described below with respect to FIGS. 1A through 5.

Example Live Media Encoding Failover Environment

FIG. 1A is a block diagram of a live media encoding failover environment 100 that includes a media source site 102, a client device 104, a live media encoding system 120, and end user devices 109, according to one embodiment. As illustrated in FIG. 1A, the live media encoding system 120 includes an encoder 122A, a backup encoder 122B, a network interface 124, a control plane 130, and a packaging system 140. While the live media encoding system 120 includes one set of encoder devices 122A-B and a single network interface 124, this is merely for illustrative purposes and is not meant to be limiting. For example, the live media encoding system 120 may include a set of encoder devices 122A-B and a network interface 124 for each live stream channel that has been set up by one or more entities. As another example, multiple live stream channels may be set up by one or more entities. Each live stream channel may be assigned to a set of encoder devices 122A-B and a network interface 124, where the live media encoding system 120 includes multiple encoder devices 122A-B and network interfaces 124. Similarly, while the live media encoding system 120 include a single packaging system 140, this is not meant to be limiting. The live media encoding system 120 can include any number of packaging systems 140. For example, one packaging system 140 may be able to handle a certain number of live streams (e.g., 5, 10, 15, 20, etc.) and the live media encoding system 120 may include at least a number of packaging systems 140 capable of handling all active live streams.

The media source site 102 is a physical location at which an event is occurring. For example, the media source site 102 can be the site of a news story, a stadium, an arena, or the like. At the media source site 102, an entity can use a contribution encoder to transmit a live stream to the network interface 124. A live stream can include one or more data packets that include encoded media (e.g., video, audio, audio and video, etc.). In an embodiment, the contribution encoder is a computing device that receives media from a source (e.g., a camera, a microphone, etc.) and encodes the media for transmission over network 110. A single contribution encoder can receive media from one or more sources. A single contribution encoder can also transmit the encoded media to one or more network interfaces 124, as described in greater detail below.

The media source site 102 can also include multiple contribution encoders. For example, each contribution encoder may receive media from a different source (e.g., different camera angles or views captured from various locations at the same event, media captured from cameras located at different events, etc.). Alternatively, each contribution encoder can receive media from the same source. The contribution encoders can transmit the encoded stream to the same network interface 124 or different network interfaces 124.

An entity can manually set values for parameters for encoding the media. Alternatively, parameter values can be received automatically from the live media encoding system 120. The parameters can include the codec (e.g., audio codec, video codec, etc.), bitrate (e.g., audio bitrate, video bitrate, etc.), image dimension, chroma subsampling, GOP length, GOP structure, scan type (e.g., progressive, interlaced, etc.), transport type (e.g., user datagram protocol (UDP), transmission control protocol (TCP), etc.), audio sampling rate, video frame rate, forward error correction (FEC) type (e.g., automatic repeat request (ARQ), RAPTORQ™, etc.), or the like.

The client device 104 is a computing device (e.g., desktop, laptop, mobile device, etc.) configured to access the control plane 130 via the network 110. In an embodiment, the control plane 130 can allocate and/or re-allocate computing resources in the live media encoding system 120 to a live stream, including configuring and allocating to a live stream the encoder device 122A, the backup encoder device 122B, and the packaging system 140. For example, an entity can use the client device 104 to send an instruction to the control plane 130 (e.g., application programming interface (API) calls) to set up a live stream (e.g., transmit a request to set up a channel to transmit an encoded stream of data). The instruction can include details on how the live stream will be distributed to end user devices 109 (e.g., duration of the live stream, bitrates available to end user devices 109, which devices can access the live stream, distribution format, etc.) and which contribution encoder will be used to transmit the live stream. In response to receiving the instruction, the control plane 130 can allocate the network interface 124, the encoder device 122A, the backup encoder device 122B, and components in the packaging system 140 (e.g., network interface 222, packaging ingest device 202A, load balancer 224, and/or packaging egress device 206 of FIG. 2 described below) to the live stream (e.g., the channel through which the live stream is transmitted) and/or configure parameters for one or more of these components of the live media encoding system 120. The control plane 130 can allocate such components before or after the live stream is started. The network interface 124 may remain allocated to the live stream for the life of the live stream, whereas the encoder devices 122A-B and/or the components in the packaging system 140 may be allocated to the live stream for at least a portion of the live stream (e.g., the encoder devices 122A-B and/or the components in the packaging system 140 may be allocated to the live stream for as long as the underlying hardware has not failed), as described in greater detail below. The client device 104 can be physically located separately from the media source site 102. For example, the client device 104 can be located at an entity's office whereas the media source site 102 can be located remote from the entity's office (e.g., a location at which an event is occurring).

Once the computing resources are allocated, the control plane 130 may transmit information identifying the location (e.g., IP address, port, etc.) of the network interface 124 to the client device 104 so that the entity can configure the contribution encoder at the media source site 102. The control plane 130 may also transmit to the client device 104 contribution encoder parameter values for configuring the contribution encoder. Alternatively or in addition, the control plane 130 can transmit the contribution encoder parameter values and/or the location information to the contribution encoder at the media source site 102 so that the contribution encoder can be automatically configured.

The contribution encoder at the media source site 102 can begin transmitting the live stream to the network interface 124 after the configuration is complete. The network interface 124 can be coupled to the encoder device 122A, which is the initial encoder device allocated to the live stream. Thus, the network interface 124 can forward the received live stream to the encoder device 122A. In some embodiments, the encoder device 122A transcodes the live stream into a different format, bitrate, and/or the like. For example, the encoder device 122A can transcode the live stream based on settings provided by the client device 104 during the live stream set up. In other embodiments, the encoder device 122A does not transcode the live stream. After an optional transcoding of the live stream, the encoder device 122A can forward the live stream to the network interface 124 for transmission to the packaging system 140. As described in greater detail below with respect to FIG. 2, the packaging system 140 can add digital rights management attributes to the live stream (e.g., attributes that restrict access to, modification of, and/or distribution of the live stream), store the live stream, and distribute the live stream to various end user devices 109.

The control plane 130 may include and execute a plurality of failure detectors 132 that are configured to monitor for failed or failing (e.g., the hardware of the component will fail within a certain period of time, such as 5 minutes, 10 minutes, 1 hour, 1 day, 1 week, etc.) live media encoding system 120 components using a gossip protocol. For example, the encoder device 122A, the backup encoder device 122B, and components in the packaging system 140 may each execute a failure detector as well. The encoder device 122A failure detector may be configured to periodically transmit a communication to a random selection of other encoder device failure detectors (e.g., encoder device failure detectors executing on encoder devices allocated to other live stream channels). Similarly, the failure detectors executing on the components in the packaging system 140 may be configured to periodically transmit a communication to a random selection of other packaging system 140 component failure detectors. In response to transmitting the communication, an encoder device failure detector may expect to receive a response (e.g., an acknowledgement). If the encoder device failure detector does not receive a response within a threshold period of time (e.g., which can be the same or different for individual types of components in the live media encoding system 120), then the encoder device failure detector determines that the component to which the communication was transmitted has failed or is about to fail. For example, if an encoder device failure detector transmits a communication to the encoder device 122A failure detector and does not receive a response within a threshold period of time, then the encoder device failure detector may determine that the encoder device 122A has failed or is about to fail. The encoder device failure detector may then transmit this determination to one or more other encoder device failure detectors, and the determination can be propagated to various component failure detectors until the determination reaches a failure detector 132. Upon the failure detector 132 receiving the determination, the control plane 130 can begin the process of reallocating computing resources to counteract the effects of the encoder device 122A failing or about to fail. The control plane 130 can execute one or more failover agents 134 to reallocate computing resources. For example, one or more failover agents 134 can send instructions and/or perform operations to transition from the failed encoder device 122A to a new encoder device (e.g., backup encoder device 122B) that takes the place of the failed encoder device 122A. Additional details of how a component failure is detected are described below with respect to FIGS. 3 and 5.

Figure 1B:
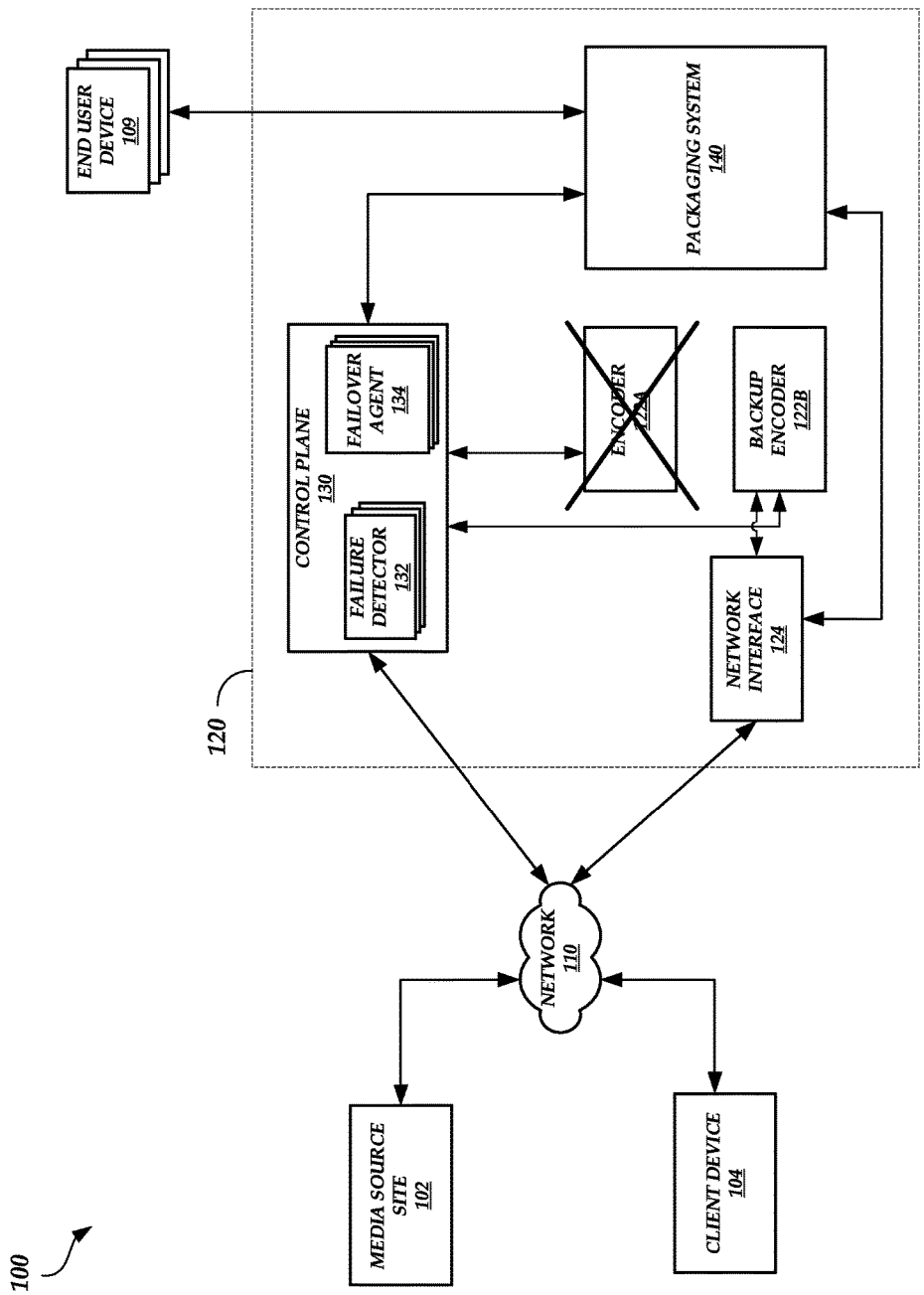
FIG. 1B is another block diagram of the live media encoding failover environment of FIG. 1A after an encoder device fails, according to one embodiment.

FIG. 1B is another block diagram of the live media encoding failover environment 100 of FIG. 1A after the encoder device 122A fails, according to one embodiment. As illustrated in FIG. 1B, an encoder device failure detector has determined that the encoder device 122A has failed or is about to fail and a failure detector 132 has received the determination. In response, the control plane 130 (e.g., the one or more failover agents 134) moves the network interface 124 by de-coupling or detaching the network interface 124 from the now-failed encoder device 122A and coupling or attaching the network interface 124 to the backup encoder device 122B that was initially allocated to the live stream. The control plane 130 (e.g., the one or more failover agents 134) may then allocate a new encoder device to the live stream to serve as a backup to the backup encoder device 122B.

The contribution encoder at the media source site 102 may continue transmitting the live stream to the network interface 124. However, the backup encoder device 122B, and not the encoder device 122A, may perform any desired transcoding. The backup encoder device 122B can then forward the live stream to the packaging system 140 via the network interface 124.

In some embodiments, there may be a short interruption in the live stream when the control plane 130 moves the network interface 124 from the encoder device 122A to the backup encoder device 122B. For example, when a failure detector 132 detects that the encoder device 122A has failed or is failing, the control plane 130 determines which encoder device is allocated as the backup encoder device (e.g., the backup encoder device 122B). The control plane 130 then may suspend or pause the live stream by transmitting a message to the contribution encoder at the media source site 102 to pause transmission or by ignoring packets received from the contribution encoder. The control plane 130 can then instruct the backup encoder device 122B to start running one or more applications used to transcode the live stream. Alternatively, the control plane 130 can instruct the backup encoder device 122B to start running the one or more applications when the backup encoder device 122B is initially allocated to the live stream. Once the one or more applications are running, the control plane 130 can then move the network interface 124 as described herein, restart the live stream (e.g., by transmitting a message to the contribution encoder to restart the live stream or by no longer ignoring packets received from the contribution encoder), and allocate a new encoder device to the live stream to serve as a backup to the backup encoder device 122B.

While this process may cause a short interruption in the live stream, this interruption may be shorter than an interruption that would be caused by instructing the entity and/or the contribution encoder to modify parameter values and/or a live stream destination as performed in conventional systems. In addition, the interruption in conventional systems may be longer because, for example, no dedicated backup encoder device may be allocated to the live stream. The conventional control plane 130 may need to identify an available encoder device to serve as a backup, configure the backup encoder device 122B (e.g., instruct the backup encoder device 122B to start running the one or more applications used to transcode the live stream), and reallocate computing resources such that the backup encoder device provides the live stream to the appropriate components in the packaging system 140.

Optionally, the live media encoding system 120 can further reduce the time that the live stream is interrupted. For example, when the live stream is set up, the contribution encoder can be instructed to transmit the live stream to a first network interface 124 and a second network interface 124. The first network interface 124 may be coupled to the allocated encoder device 122A and the encoder device 122A may operate as described herein. The second network interface 124 may be coupled to the allocated backup encoder device 122B. Because the allocated encoder device 122A is active, the second network interface 124 may drop received packets (e.g., packets that form the live stream). However, if the encoder device 122A fails or is failing, then the second network interface 124 may begin to forward the received packets to the backup encoder device 122B and the backup encoder device 122B can perform the operations originally performed by the encoder device 122A. Alternatively, the second network interface 124 may forward the received packets to the backup encoder device 122B even when the encoder device 122A is active. The backup encoder device 122B may transcode the live stream in the same manner as the encoder device 122A. However, the backup encoder device 122B may not transmit the transcoded live stream to the packaging system 140 via the second network interface 124 and/or the second network interface 124 may drop the packets before transmission to the packaging system 140. If the encoder device 122A fails or is failing, then the backup encoder device 122B can transmit the transcoded live stream to the packaging system 140 via the second network interface 124 and/or the second network interface 124 no longer drops the packets and forwards the packets to the packaging system 140. Thus, the backup encoder device 122B may automatically take over for the encoder device 122A in the event of a failure without a pause or suspension of the live stream transmission.

In addition to providing a known, set endpoint to which the contribution encoder at the media source site 102 can transmit the live stream to minimize interruptions, the network interface 124 may provide additional benefits. For example, sometimes the failure detectors can falsely determine that a particular encoder device is failing or has failed (e.g., a response transmitted by the encoder device does not reach the intended destination or the response is received after the threshold period of time expires). If the network interface 124 did not serve as an interface between the encoder device 122A and the packaging system 140, then a falsely-detected failure could result in both the encoder device 122A and the backup encoder device 122B sending data to the packaging system 140. Often, data transmitted by the encoder device 122A and the backup encoder device 122B are not synchronized. For example, a transcoded portion of the live stream transmitted by the encoder device 122A at a first time may not match a transcoded portion of the live stream transmitted by the backup encoder device 122B at the first time. Thus, the packaging system 140 may not be able to resolve conflicts in data transmitted by the encoder device 122A and the backup encoder device 122B, causing the one or more end user devices 109 to receive unsynchronized and jumbled data packets of the live stream. By using the network interface 124 to serve as an interface between an encoder device and the packaging system 140, a falsely-detected failure would not result in the errors described above because only the data transcoded by the backup encoder device 122B would reach the packaging system 140 (e.g., once the network interface 124 has been coupled to the backup encoder device 122B).

The live media encoding system 120 (and each of the components therein) may include one or more processors, memory that stores instructions executed by the one or more processors, network interfaces, application-specific hardware, or other hardware components that allow the system to perform the functionality described herein.

While a single live media encoding system 120 is illustrated in FIGS. 1A-1B, this is not meant to be limiting. The live media encoding failover environment 100 may include any number of live media encoding systems, where the multiple live media encoding systems can be accessed via the network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to or from the Internet.

It will be appreciated that the example of FIGS. 1A-1B has been simplified for the purposes of explanation, and that the number and organization of components in the live media encoding system 120 may be much larger or smaller than what is depicted in FIGS. 1A-1B. For example, as one illustrative embodiment, the live media encoding system 120 may include one or more load balancers to serve as an interface between the control plane 130 and the packaging system 140. As another example, as one illustrative embodiment, the live media encoding system 120 can include a content delivery network (CDN) to facilitate the delivery of the live stream to the one or more end user devices 109. As another example, the functionality of the network interface 124, the encoder device 122A, and/or the packaging system 140 can be combined and performed by a single computing device.

The client device 104 and the end user devices 109 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

Figure 2:
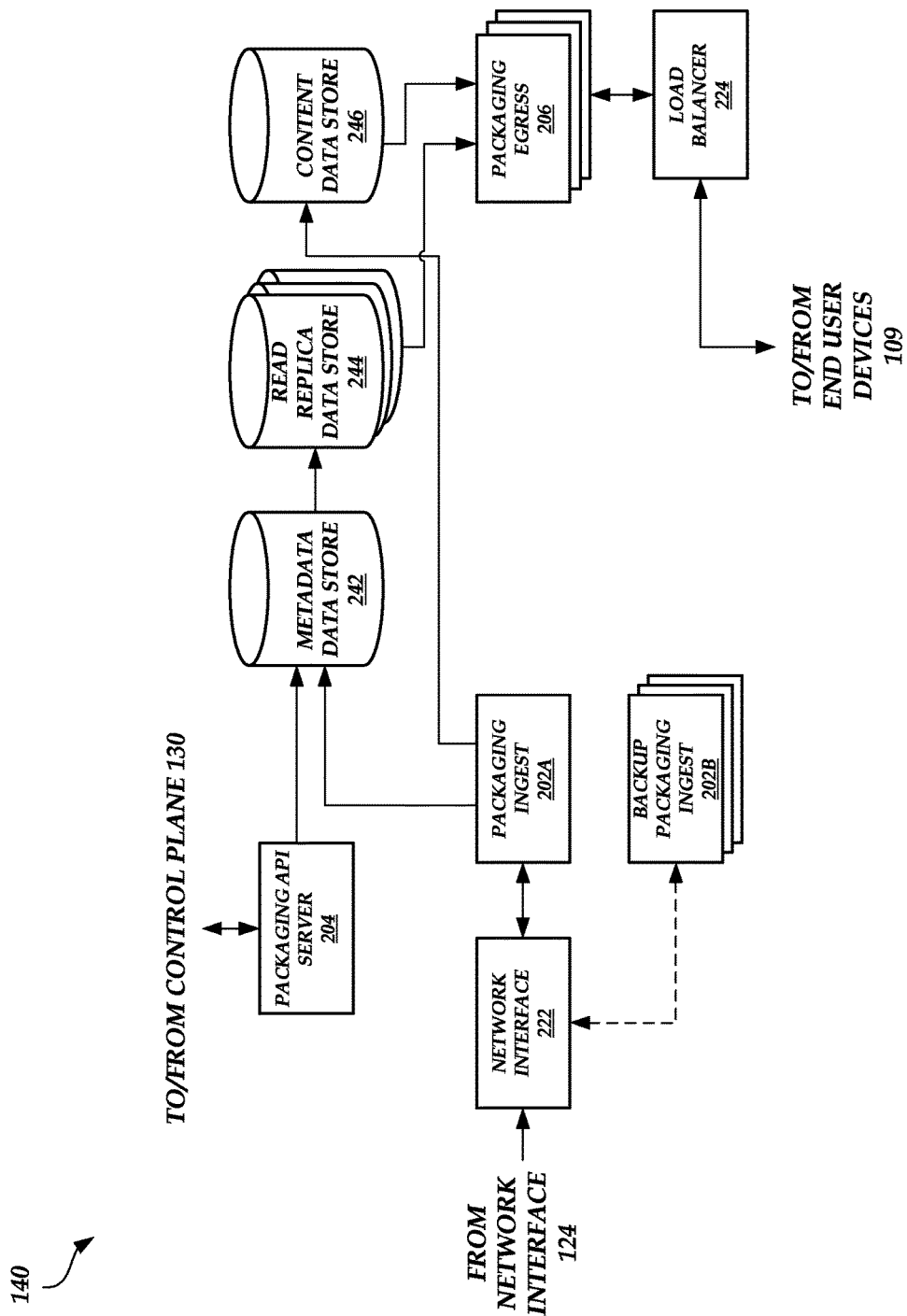
FIG. 2 is a block diagram of the packaging system of FIGS. 1A-1B, according to one embodiment.

FIG. 2 is a block diagram of the packaging system 140 of FIGS. 1A-1B, according to one embodiment. As illustrated in FIG. 2, the packaging system 140 can include a packaging ingest device 202A, a pool of backup packaging ingest devices 202B, a packaging API server 204, a pool of packaging egress devices 206, a network interface 222, a load balancer 224, a metadata data store 242, one or more read replica data stores 244, and a content data store 246.

When a live stream is set up, the control plane 130 may allocate the packaging ingest device 202A to the live stream. In addition, the control plane 130 may assign the pool of packaging ingest devices 202B to serve as possible backup packaging ingest devices. If the allocated packaging ingest device 202A fails or is failing, then the control plane 130 (e.g., the one or more failover agents 134) may select one packaging ingest device from the pool of packaging ingest devices 202B to serve as the backup packaging ingest device. The selection may be based on which packaging ingest device is idle, which packaging ingest device has the bandwidth to perform the operations described herein, and/or the like.

Unlike with the encoder devices 122A-122B, the control plane 130 may not initially allocate a specific packaging ingest device to serve as a backup. A specific packaging ingest device may not be allocated to the live stream to serve as a backup because a live stream interruption may not occur when the packaging ingest device 202A fails or is failing. For example, the network interface 124, the encoder devices 122A-B, and/or the network interface 222 may include a data buffer to temporarily store the optionally transcoded live stream. Thus, if the allocated packaging ingest device 202A fails or is failing, the live stream data may not be lost. Instead, the live stream data may remain in the data buffer (e.g., the encoder device 122A or 122B may start buffering the optionally transcoded live stream data) and be transmitted to the new packaging ingest device selected by the control plane 130 once the network interface 222 is coupled to the new packaging ingest device.

Furthermore, when a live stream is set up, the control plane 130 may allocate one or more packaging egress devices in the pool of packaging egress devices 206 to the live stream. The control plane 130 may not allocate a specific packaging egress device in the pool of packaging egress devices 206 to serve as a backup packaging egress device. Rather, the pool of packaging egress devices 206 may be configured such that if one packaging egress device fails, one or more of the other packaging egress devices in the pool of packaging egress devices 206 automatically take over for the failed packaging egress device.

The control plane 130 can configure the allocated packaging ingest device 202A and/or the allocated packaging egress device in the pool of packaging egress devices 206 (e.g., configure the components with input filter configurations and/or output filter configurations). For example, the control plane 130 can transmit an API call to the packaging API server 204 that includes the configuration data. The packaging API server 204 may store the configuration data in the metadata data store 242 for distribution to the components of the packaging system 140.

The network interface 222 may be coupled or attached to the allocated packaging ingest device 202A. Like with the network interface 124, the network interface 222 may remain allocated to the live stream for the life of the live stream. In an embodiment, the network interface 222 communicates with the network interface 124 to receive the live stream optionally transcoded by the encoder device 122A or 122B. While the packaging ingest device 202A is active (e.g., the packaging ingest device 202A has not failed or is not failing), the network interface 222 may forward the received live stream to the packaging ingest device 202A. If the packaging ingest device 202A fails or is failing, then the control plane 130 (e.g., the one or more failover agents 134) may de-couple the network interface 222 from the packaging ingest device 202A and couple the network interface 222 to the packaging ingest device in the pool of backup packaging ingest devices 202B selected by the control plane 130 to replace the packaging ingest device 202A. Once failed, the packaging ingest device 202A may no longer be allocated to the live stream (e.g., the packaging ingest device 202A may be terminated).

Unlike the encoder device 122A, the packaging ingest device 202A may not perform any transcoding. Instead, the packaging ingest device 202A may repackage the live stream into a different transport protocol packaging standard, add digital rights management attributes to the live stream, and/or the like. After repackaging the live stream, the packaging ingest device 202A can store data segments of the live stream in the content data store 246 and metadata associated with the data segments (e.g., an identity of a location of a data segment stored in the content data store 246, data segment playback duration information, information used to construct a manifest file, etc.) in the metadata data store 242.

The load balancer 224 may be optionally coupled to one or more packaging egress devices in the pool of packaging egress devices 206 allocated to the live stream. Like with the network interface 124, the load balancer 224 may remain allocated to the live stream for the life of the live stream. In an embodiment, the load balancer 224 receives requests for data segments and/or metadata associated with data segments from one or more end user devices 109. The load balancer 224 forwards the requests to the allocated packaging egress device and the allocated packaging egress device communicates with one of the read replica data stores 244 and the content data store 246 to retrieve the requested data. The allocated packaging egress device then forwards requested data segments and/or metadata associated with the data segments to the load balancer 224 for distribution to the one or more end user devices 109. If the allocated packaging egress device fails or is failing, then the control plane 130 (e.g., the one or more failover agents 134) may de-couple the load balancer 224 from the allocated packaging egress device and couple the load balancer 224 to the packaging egress device in the pool of packaging egress devices 206 that automatically takes over for the allocated packaging egress device. Once failed, the packaging egress device may no longer be allocated to the live stream (e.g., the packaging egress device may be terminated).

The read replica data stores 244 may have read-only permissions to access content in the metadata data store 242. The control plane 130 may instruct the metadata data store 242 via the delta API server 204 to perform a streaming replication of its content for storage in each of the read replica data stores 242. Thus, each of the read replica data stores 244 may include the same content as the metadata data store 242 (although there may be some delay in achieving a complete synchronization between the metadata data store 242 and the read replica data stores 244 due to delays in replicating data). The number of read replica data stores 244 may correspond to a number of active packaging egress devices in the pool of packaging egress devices 206. For example, as additional packaging egress devices become active and request metadata, the number of read replica data stores 244 can increase to meet the demand. Thus, separating the metadata data store 242 and the read replica data stores 244 into separate data stores can allow the live media encoding system 120 to provision the metadata data store 242 based on packaging ingest device 202A demand and not packaging egress device 206 demand and to provision the read replica data store 244 based on packaging egress device 206 demand and not packaging ingest device 202A demand.

The packaging egress device can generate a manifest file (e.g., a file that indicates a playback duration of the content in the live stream or a playback duration of each data segment of the live stream) using the metadata and/or package the data segments for distribution to one or more end user devices 109 via the load balancer 224.

As described herein, the packaging ingest device 202A, the backup packaging ingest devices 202B, and the pool of packaging egress devices 206 can each run a failure detector. The failure detectors may use a gossip protocol to determine whether a component has failed, as described in greater detail below with respect to FIG. 3.

Figure 3:
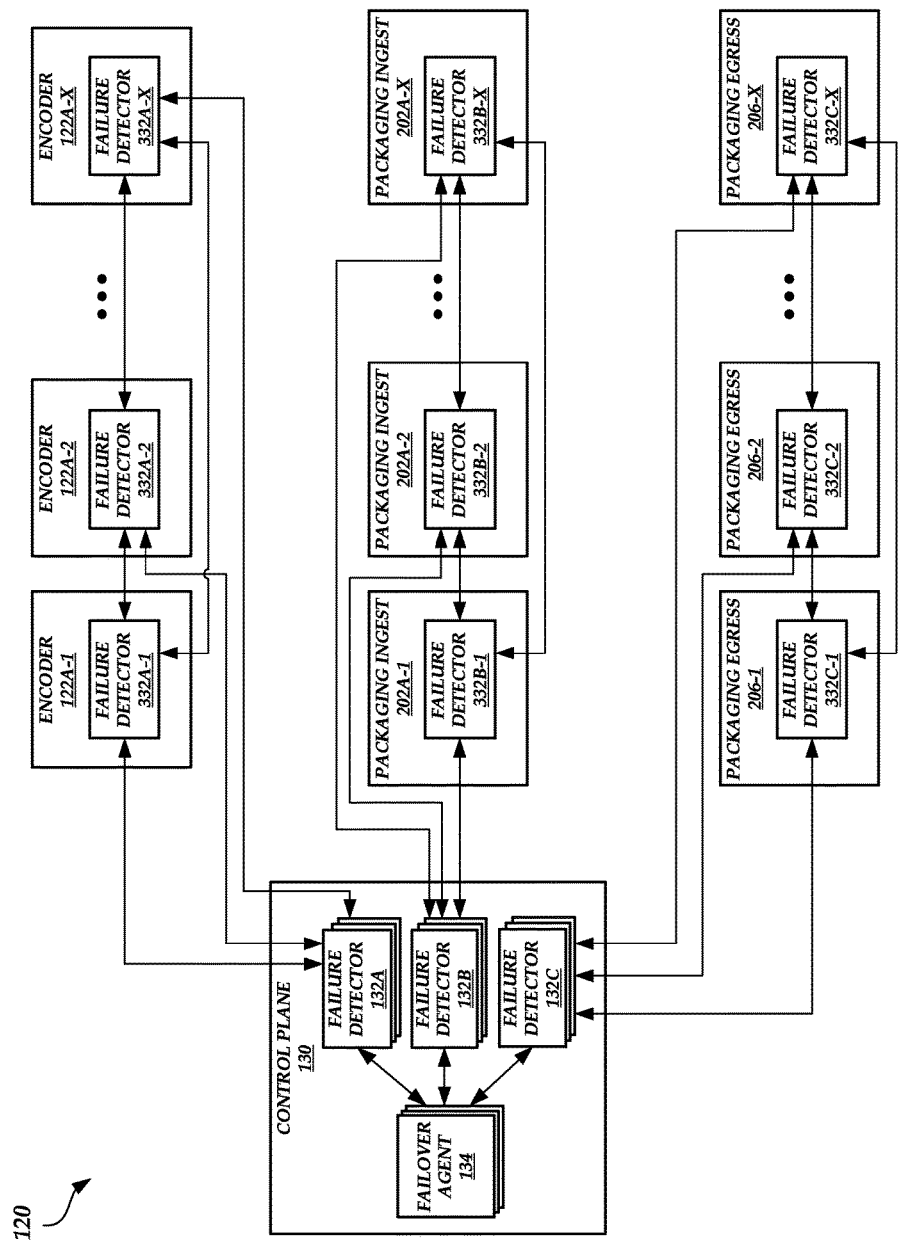
FIG. 3 is a block diagram of components of the live media encoding system of FIGS. 1A-1B that determine when a component has failed, according to one embodiment.

FIG. 3 is a block diagram of components of the live media encoding system 120 of FIGS. 1A-1B that determine when a component has failed, according to one embodiment. For example, failure detectors 132A-C, failure detectors 332A-1 through 332A-X, failure detectors 332B-1 through 332B-X, and failure detectors 332C-1 through C-X can determine whether a component in the live media encoding system 120 has failed or is failing.

As illustrated in FIG. 3, the control plane 130 includes one or more failure detectors 132A, one or more failure detectors 132B, one or more failure detectors 132C, and the one or more failover agents 134. In some embodiments, the one or more failure detectors 132A only communicate with failure detectors of encoder devices 122A, the one or more failure detectors 132B only communicate with failure detectors of packaging ingest devices 202A, and the one or more failure detectors 132C only communicate with failure detectors of packaging egress devices 206. The failure detectors 132A-C may be grouped into different sets such that each set can be independently configured to optimize for speed of detection and/or reduction in false positive failure detections. In other embodiments, not shown, the failure detectors 132 are not grouped into the different sets of failure detectors 132A-C. Rather, any of failure detectors 132A-C can communicate with any failure detector of encoder devices 122A, packaging ingest devices 202, or packaging egress devices 206.

The control plane 130 may include a plurality of failure detectors 132A, a plurality of failure detectors 132B, and/or a plurality of failure detectors 132C for redundancy purposes. For example, a plurality of failure detectors 132A, 132B, and 132C may be active to ensure that a communication is processed appropriately in case one failure detector 132A, 132B, or 132C misses the communication.

As described herein, the live media encoding system 120 can include multiple encoder devices 122A-1 through 122A-X, multiple packaging ingest devices 202A-1 through 202A-

X, and multiple packaging egress devices 206-1 through 206-X. Each encoder device 122A, each packaging ingest device 202A, and each packaging egress device 206 can execute a failure detector. For example, encoder device 122A-1 can execute the failure detector 332A-1, encoder device 122A-2 can execute the failure detector 332A-2, encoder device 122A-X can execute the failure detector 332A-X, packaging ingest device 202A-1 can execute the failure detector 332B-1, packaging ingest device 202A-2 can execute the failure detector 332B-2, packaging ingest device 202A-X can execute the failure detector 332B-X, packaging egress device 206-1 can execute the failure detector 332C-1, packaging egress device 206-2 can execute the failure detector 332C-2, packaging egress device 206-X can execute the failure detector 332C-X, and so on.

Each failure detector 332A may be configured to periodically check the status of one or more encoder devices 122A. For example, each failure detector 322A may periodically send a communication to one or more other failure detectors 332A using a gossip protocol. The other failure detectors 332A to which a respective failure detector 332A sends the communication can be selected at random. In some embodiments, each failure detector 332A sends a communication to some, but not all, of the other failure detectors 332A (e.g., each failure detector 332A only checks the status of a select few encoder devices 122A out of all encoder devices 122A present in the live media encoding system 120). Some or all of the failure detectors 332A may be configured to communicate with the one or more failure detectors 132A in the control plane. In other embodiments, one or more failure detectors 332A send a communication to all other failure detectors 332A (e.g., one or more failure detectors 332A check the status of all other encoder devices 122A in the live media encoding system 120).

If a response is not received within a threshold period of time, then the respective failure detector 332A may determine that the encoder device 122A from which a response is not received has failed or is failing. The respective failure detector 332A may then transmit this determination to other failure detectors 322A (e.g., the other failure detectors 322A that the respective failure detector 332A communicates with to check the encoder device 122A status), which then can propagate the determination until the determination reaches the one or more failure detectors 132A.

As an illustrative example, the failure detector 332A-1 can be configured to transmit a communication periodically to the failure detector 332A-2 and the failure detector 332A-X. Once a communication is transmitted to the failure detector 332A-2, the failure detector 332A-1 may wait for the failure detector 332A-2 to transmit a response within a threshold period of time. If the failure detector 332A-1 receives a response (e.g., an acknowledgment that the communication from the failure detector 332A-1 was received) within the threshold period of time, then the failure detector 332A-1 determines that the encoder device 122A-2 has not failed or is not failing. On the other hand, if the failure detector 332A-1 does not receive a response within the threshold period of time, then the failure detector 322A-1 determines that the encoder device 122A-2 has failed or is failing. The failure detector 332A-1 may then transmit a communication indicating that the encoder device 122A-2 has failed or is failing to the failure detector 332A-X and/or other failure detectors 332A. The failure detector 332A-X may forward the communication to the failure detector 132A and/or other failure detectors 332A that can directly or indirectly forward the communication to the one or more failure detectors 132A.

The failure detectors 332B and the failure detectors 332C may operate in a similar manner as the failure detectors 332A. For example, the failure detectors 332B and the failure detectors 332C can be configured to determine whether packaging ingest devices 202A and packaging egress devices 206, respectively, have failed by transmitting communications to the appropriate failure detectors 322B or 332C and waiting for responses. If responses are not received within a threshold period of time, then the failure detectors 332B and the failure detectors 332C can determine that a failure has occurred and the determination can be propagated to the one or more failure detectors 132B (by the failure detectors 332B) or the one or more failure detectors 132C (by the failure detectors 332C).

Optionally, not shown, the failure detectors 332A-C can be configured to check the status of any component in the live media encoding system 120. For example, the failure detector 332A-1 can send communications to the failure detector 332C-1 to determine whether the packaging egress device 206-1 has failed or is failing. If a failure determination is made, the determination can be propagated to either the one or more failure detectors 132A or the one or more failure detectors 132C.

When a determination is received by the failure detectors 132A-C that a particular component has failed or is failing, the failure detector 132A-C that receives the determination can forward the determination to the one or more failover agents 134. More than one failover agent 134 may be present for redundancy purposes (e.g., if one failover agent 134 fails, another failover agent 134 can take over for the failed failover agent 134 such that the failover operations are still executed). The one or more failover agents 134 may then send instructions and/or perform operations to transition from the failed component to a new component that takes the place of the failed component. For example, the one or more failover agents 134 may move the network interface 124 or 222, move load balancer 224, transmit instructions to pause or suspend a live stream, send configuration data to the delta API server 204, terminate the failed component, and/or the like.

As mentioned above, the failure detectors 132A-C can be grouped into different sets for optimization purposes. For example, a failure of an encoder device 122A may cause a temporary interruption in the live stream, but a failure of a packaging ingest device 202A or a packaging egress device 206 may not cause an interruption. Thus, it may be desirable to set a longer threshold time period for determining when an encoder device 122A has failed (e.g., to reduce the number of falsely determined failures, thereby reducing the number of unnecessary live stream interruptions) and a shorter threshold time period for determining when a packaging ingest device 202A or a packaging egress device 206 has failed (e.g., to expedite the detection of a failure given that a falsely determined failure may not result in an unnecessary live stream interruption). Accordingly, the one or more failure detectors 132A and the failure detectors 332A can be configured to wait for a response to a communication for a longer period of time than the one or more failure detectors 132B, the failure detectors 332B, the one or more failure detectors 132C, and the failure detectors 332C.

Example Failover and Failover Detection Routines

Figure 4:
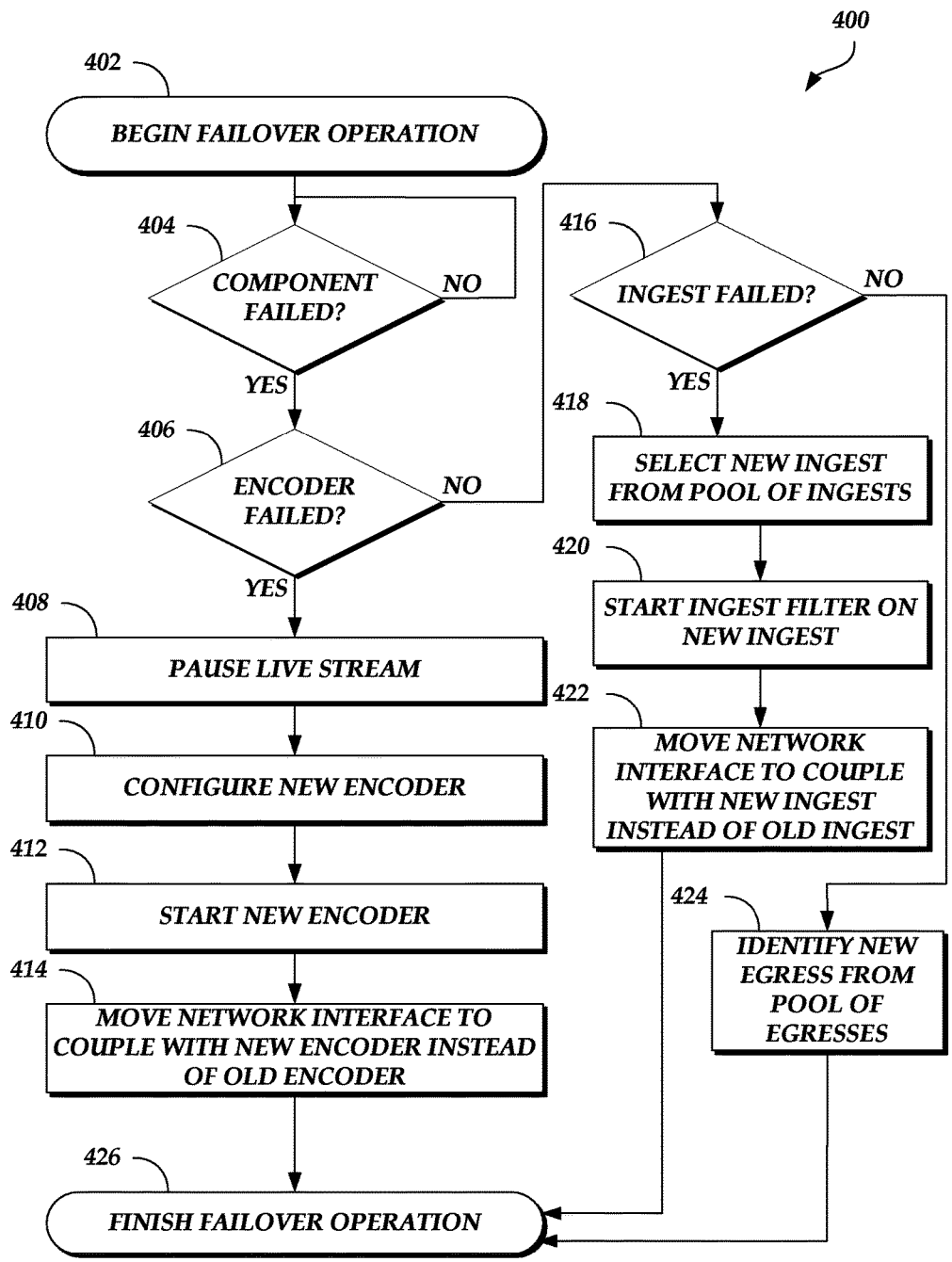
FIG. 4 is a flow diagram depicting a failover routine illustratively implemented by a live media encoding system, according to one embodiment.

FIG. 4 is a flow diagram depicting a failover routine 400 illustratively implemented by a live media encoding system, according to one embodiment. As an example, the live media encoding system 120 (e.g., the control plane 130) of FIGS. 1A-1B can be configured to execute the failover routine 400. The failover routine 400 begins at block 402.

At block 404, a determination is made as to whether a component failed (or is failing). For example, the component can be an encoder device, a packaging ingest device, or a packaging egress device allocated to a live stream. The determination can be made based on a communication received from a failure detector running one an encoder device, a packaging ingest device, or a packaging egress device indicating that a particular component has failed or is failing. If a component has failed (or is failing), then the failover routine 400 proceeds to block 406. Otherwise, if a component has not failed (or is not failing), then the failover routine 400 returns to block 404 and repeats the determination.

At block 406, a determination is made as to whether an encoder device has failed (or is failing). The determination can be made based on which type of failure detector propagated the determination to the control plane 130 (e.g., a failure detector running on an encoder device, a packaging ingest device, or a packaging egress device) and/or which set of failure detectors 132 running on the control plane 130 received the determination (e.g., the failure detector 132A that receives communications from encoder device failure detectors, the failure detector 132B that receives communications from packaging ingest device failure detectors, or the failure detector 132C that receives communications from packaging egress device failure detectors). Block 406 may be included in the failover routine 400 for illustrative purposes and may not actually be performed by the control plane 130. For example, the control plane 130 may make the determination of what type of component failed or is failing based on which failure detector 132A-C received the communication and therefore may not perform the cascading logic represented by blocks 406 and 416. If an encoder device failed or is failing, the failover routine 400 proceeds to block 408. Otherwise, if an encoder device has not failed, then the failover routine 400 proceeds to block 416.

At block 408, a live stream is paused or suspended. For example, the control plane 130 can transmit a message to the client device 104 and/or the contribution encoder at the media source site 102 indicating that a component has failed and to pause transmission of the live stream. Alternatively, the control plane 130 can instruct the network interface that attaches to an encoder device allocated to the live stream to temporarily drop or ignore packets until the backup encoder device is ready to take over for the failed or failing encoder device. Block 408 is optional. For example, the failover routine 400 can proceed from block 406 to block 410 if the encoder device failed or is failing.

At block 410, a new encoder device is configured. For example, the new encoder device that is configured may be the backup encoder device (e.g., the backup encoder device 122B) initially allocated to the live stream when the live stream is set up. The control plane 130 may configure the new encoder device by setting parameter values of the new encoder device to match the parameter values of the failed encoder device.

At block 412, the new encoder device is started. For example, the control plane 130 may instruct the new encoder device to start running one or more applications used to transcode the live stream.

At block 414, a network interface is moved to couple with the new encoder device instead of the old, failed encoder device. For example, the network interface may receive the live stream from the contribution encoder at the media source site 102. The network interface may initially be coupled or attached to the allocated encoder device and may forward the live stream to the allocated encoder device for transcoding. When the allocated encoder device fails or is failing, the control plane 130 can de-couple or detach the network interface from the failed encoder device and couple or attach the network interface to the new encoder device so that the new encoder device can begin transcoding the live stream.

While blocks 408, 410, 412, and 414 are depicted in a specific order in FIG. 4, this is not meant to be limiting. For example, any of blocks 408, 410, 412, and 414 can be performed in any order and/or in parallel. As an illustrative example, the one or more applications may be started on the new encoder device when the new encoder device is initially allocated to the live stream as a backup encoder device. The network interface coupled to the old encoder device may then be instructed to drop and/or ignore live stream packets when the old encoder device fails.

Optionally, the control plane 130 can then provision a new encoder device to act as a backup to the new encoder device. If the new encoder device fails or begins to fail, then the newly provisioned backup encoder device can take over for the new encoder device (and the control plane 130 can again allocate a new backup encoder device to the live stream). The control plane 130 can then instruct the client device 104 and/or the contribution encoder to resume transmission of the live stream and/or instruct the network interface to no longer drop packets of the live stream. After the network interface is moved to the new encoder device, the failover routine 400 may be complete, as shown in block 426.

At block 416, a determination is made as to whether a packaging ingest device failed (or is failing). As described above, the determination can be made based on which type of failure detector propagated the determination to the control plane 130 (e.g., a failure detector running on an encoder device, a packaging ingest device, or a packaging egress device) and/or which set of failure detectors 132 running on the control plane 130 received the determination (e.g., the failure detector 132A that receives communications from encoder device failure detectors, the failure detector 132B that receives communications from packaging ingest device failure detectors, or the failure detector 132C that receives communications from packaging egress device failure detectors). Block 416 may be included in the failover routine 400 for illustrative purposes and may not actually be performed by the control plane 130. For example, the control plane 130 may make the determination of what type of component failed or is failing based on which failure detector 132A-C received the communication and therefore may not perform the cascading logic represented by blocks 406 and 416. If a packaging ingest device failed or is failing, the failover routine 400 proceeds to block 418. Otherwise, if a packaging ingest device has not failed, then a packaging egress device has failed or is failing and the failover routine 400 proceeds to block 424.

At block 418, a new packaging ingest device is selected from a pool of packaging ingest devices. For example, the control plane 130 may select the new packaging ingest device to serve as a replacement for the failed or failing packaging ingest device. The control plane 130 may make the selection based on which packaging ingest device is idle, which packaging ingest device has the bandwidth to perform the operations described herein, and/or the like.

At block 420, an ingest filter is started on the new packaging ingest device. For example, the ingest filter may be configured to repackage the live stream into a different transport protocol packaging standard, add digital rights management attributes to the live stream, and/or the like.

At block 422, a network interface is moved to couple with the new packaging ingest device instead of the old, failed packaging ingest device. For example, the network interface may receive an optionally transcoded live stream from the network interface coupled to the encoder device. The network interface may initially be coupled or attached to the allocated packaging ingest device and may forward the optionally transcoded live stream to the allocated packaging ingest device for processing and storage. When the allocated packaging ingest device fails or is failing, the control plane 130 can de-couple or detach the network interface from the failed packaging ingest device and couple or attach the network interface to the new packaging ingest device. After the network interface is moved to the new packaging ingest device, the failover routine 400 may be complete, as shown in block 426.

At block 424, a new packaging egress device from a pool of packaging egress devices is identified. For example, the pool of packaging egress devices may automatically select a new packaging egress device to take the place of a packaging egress device that has failed. After the new packaging egress device is identified, the failover routine 400 may be complete, as shown in block 426.

Figure 5:
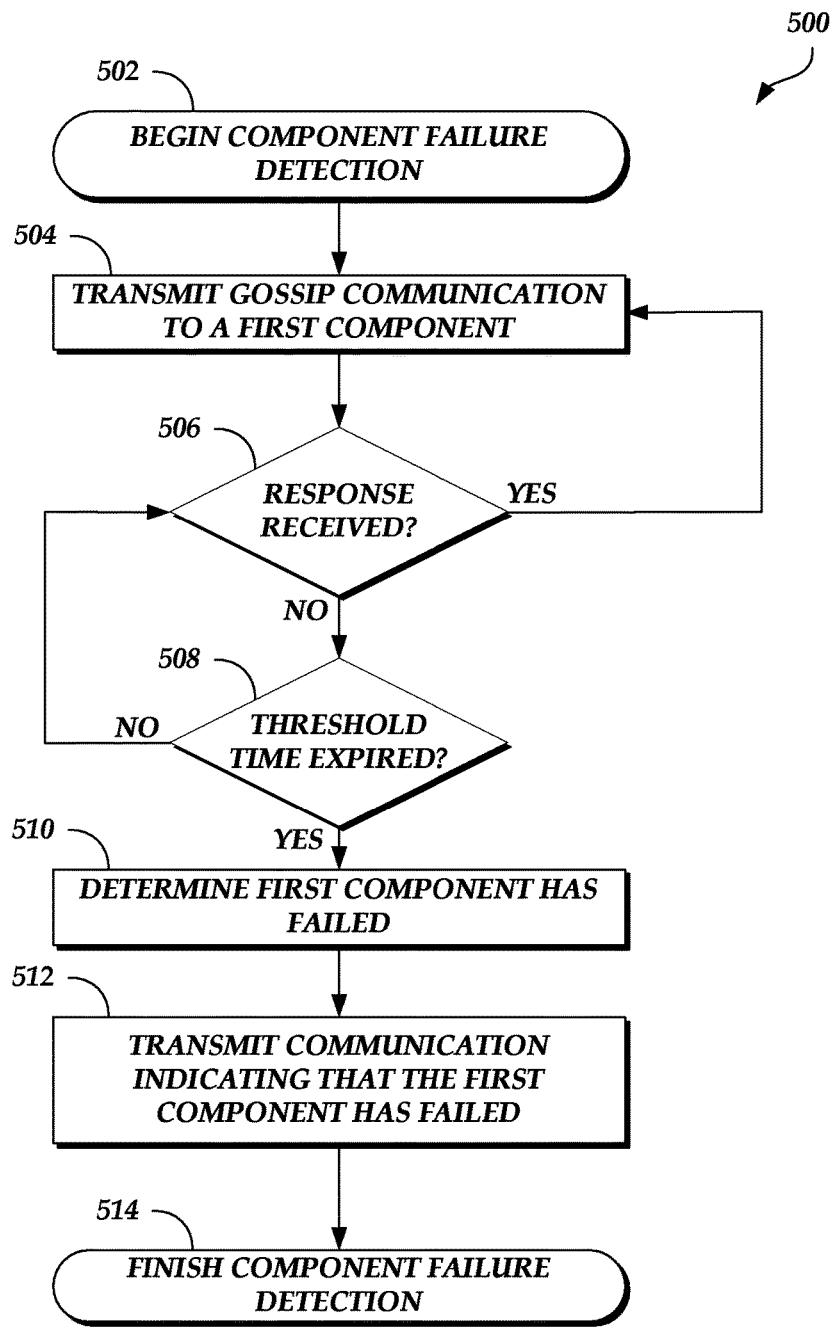
FIG. 5 is a flow diagram depicting a component failure detection routine illustratively implemented by a live media encoding system, according to one embodiment.

FIG. 5 is a flow diagram depicting a component failure detection routine 500 illustratively implemented by a live media encoding system, according to one embodiment. As an example, the live media encoding system 120 (e.g., a failure detector 132, 332A, 332B, or 332C) of FIGS. 1A through 3 can be configured to execute the failover detection routine 500. The failover detection routine 500 begins at block 502.

At block 504, a gossip communication is transmitted to a first component. For example, a failure detector 332A-C can transmit a communication to the first component according to a gossip protocol. In some embodiments, the first component is the same type of component as the component that is running the failure detector that transmitted the gossip communication. In other embodiments, the first component is a different type of component than the component that is running the failure detector that transmitted the gossip communication.

At block 506, a determination is made as to whether a response to the gossip communication is received. For example, the response may be an acknowledgement message indicating that the gossip communication was received. If a response has been received, then the failover detection routine 500 proceeds back to block 504 and the failure detector may continue to periodically check the status of component by transmitting gossip communications. Otherwise, if a response has not been received, then the failover detection routine 500 proceeds to block 508.

At block 508, a determination is made as to whether the threshold time period has expired. As described herein, the threshold time period may depend on the type of component that is being evaluated. For example, if the component is an encoder device, then the threshold time period may be a first time. If the component is a packaging ingest device or a packaging egress device, then the threshold time period may be a second time that is shorter than the first time. If the threshold time period has not expired, then the failover detection routine 500 proceeds back to block 506 and the failure detector again checks to determine whether a response is received. Otherwise, if the threshold time period has expired, then the failover detection routine 500 proceeds to block 510.

At block 510, the first component is determined to have failed or in the process of failing. At block 512, a communication indicating that the first component has failed is transmitted. The communication can be transmitted to another failure detector running on another component and/or a failure detector running in the control plane 130. Whether the communication is transmitted to another failure detector running on another component or a failure detector running in the control plane 130, the communication is propagated through the various failure detectors and eventually reaches the control plane 130. Once received, the control plane 130 may initiate a failover routine, such as the failover routine 400 described above with respect to FIG. 4. After the communication indicating that the first component has failed or is in the process of failing has been transmitted, then the failover detection routine 500 may be complete, as shown in block 514.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for reallocating computing resources during a failover event, the system comprising:
    a network interface configured to receive an encoded stream of media from a contribution encoder located in a first geographic region;
    an encoder device configured to transcode received data for distribution to one or more end user devices;
    a backup encoder device configured to transcode received data for distribution to the one or more end user devices; and
    a control system including a processor and memory, wherein instructions stored in the memory, when executed, cause the control system to:
        receive a request to set up a channel for transmitting the encoded stream of media;
        allocate the network interface, the encoder device, and a backup encoder device to the channel;
        instruct the contribution encoder to transmit the encoded stream of media to the network interface, wherein the network interface is coupled to the encoder device and is configured to transmit the received encoded stream of media to the encoder device;
        determine that the encoder device has failed;
        de-couple the network interface from the encoder device; and
        couple the network interface to the backup encoder device such that the network interface is configured to transmit the received encoded stream of media to the backup encoder device in place of the encoder device.

2. The system of claim 1, wherein the instructions, when executed, further cause the control system to:
    configure the backup encoder device to include parameter values that match parameter values of the encoder device; and
    instruct the backup encoder device to start one or more applications used to transcode the encoded stream of media.

3. The system of claim 2, wherein the instructions, when executed, further cause the control system to allocate a second backup encoder device to the channel, wherein the second backup encoder device serves as a backup to the backup encoder device.

4. The system of claim 1, wherein the instructions, when executed, further cause the control system to determine that the encoder device has failed based on a communication received from a second encoder device.

5. The system of claim 4, wherein the second encoder device is configured to determine that the encoder device has failed based on a lack of response to a second communication transmitted by the second encoder device to the encoder device within a threshold period of time.

6. A computer-implemented method for reallocating computing resources during a failover event, the method comprising:

as implemented by one or more computing devices configured with specific executable instructions, receiving a request to set up a channel for transmitting an encoded stream of media;

allocating a network interface, an encoder device, and a backup encoder device to the channel, wherein the encoder device and the backup encoder device transcode received data;

instructing a contribution encoder at a location at which the encoded stream of media originates to transmit the encoded stream of media to the network interface, wherein the network interface is coupled to the encoder device and is configured to transmit the received encoded stream of media to the encoder device;

receiving an indication that the encoder device has failed;

coupling the network interface to the backup encoder device instead of the encoder device such that the network interface is configured to transmit the received encoded stream of media to the backup encoder device.

7. The computer-implemented method of claim 6, further comprising:

configuring the backup encoder device to include parameter values that match parameter values of the encoder device; and instructing the backup encoder device to start one or more applications used to transcode the encoded stream of media.

8. The computer-implemented method of claim 7, further comprising allocating a second backup encoder device to the channel, wherein the second backup encoder device serves as a backup to the backup encoder device.

9. The computer-implemented method of claim 6, further comprising:

instructing the network interface to drop packets corresponding to the encoded stream of media;

configuring the backup encoder device to include parameter values that match parameter values of the encoder device;

instructing the backup encoder device to start one or more applications used to transcode the encoded stream of media; and instructing the network interface to stop dropping the packets corresponding to the encoded stream of media after the network interface is coupled to the backup encoder device.

10. The computer-implemented method of claim 6, further comprising allocating a second network interface, a load balancer, a packaging ingest device, and a pool of backup packaging ingest devices, and a packaging egress device in a pool of packaging egress devices to the channel.

11. The computer-implemented method of claim 10, wherein the second network interface is coupled to the packaging ingest device and is configured to receive a transcoded stream of media from the network interface for transmission to the packaging ingest device.

12. The computer-implemented method of claim 11, further comprising:

receiving an indication that the packaging ingest device has failed;

selecting a second packaging ingest device from the pool of backup packaging ingest devices to serve as a backup for the packaging ingest device; and coupling the second network interface to the second packaging ingest device instead of the packaging ingest device such that the second network interface is configured to transmit the transcoded stream of media to the second packaging ingest device.

13. The computer-implemented method of claim 12, wherein the backup encoder device buffers transcoded data when the indication that the packaging ingest device has failed is received and resumes transmission of the transcoded when the second network interface is coupled to the second packaging ingest device.

14. The computer-implemented method of claim 6, wherein receiving an indication that the encoder device has failed further comprises receiving the indication that the encoder device has failed based from a second encoder device.

15. The computer-implemented method of claim 14, wherein the second encoder device is configured to determine that the encoder device has failed based on a lack of response to a communication transmitted by the second encoder device to the encoder device within a threshold period of time.

16. A non-transitory computer-readable medium having stored thereon executable program code that directs one or more computing devices to perform operations when executed, the operations comprising:

allocating a network interface, an encoder device, and a backup encoder device to a channel for transmitting an encoded stream of media, wherein the encoder device and the backup encoder device transcode received data;

instructing a contribution encoder at a location at which the encoded stream of media originates to transmit the encoded stream of media to the network interface, wherein the network interface is coupled to the encoder device and is configured to transmit the received encoded stream of media to the encoder device;

receiving an indication that the encoder device has failed;

coupling the network interface to the backup encoder device instead of the encoder device such that the network interface is configured to transmit the received encoded stream of media to the backup encoder device.

17. The non-transitory computer-readable medium of claim 16, wherein the operations further comprise:

configuring the backup encoder device to include parameter values that match parameter values of the encoder device; and instructing the backup encoder device to start one or more applications used to transcode the encoded stream of media.

18. The non-transitory computer-readable medium of claim 17, wherein the operations further comprise allocating a second backup encoder device to the channel, wherein the second backup encoder device serves as a backup to the backup encoder device.

19. The non-transitory computer-readable medium of claim 16, wherein the operations further comprise allocating a second network interface, a load balancer, a packaging ingest device, and a pool of backup packaging ingest devices, and a packaging egress device in a pool of packaging egress devices to the channel.

20. The non-transitory computer-readable medium of claim 19, wherein the second network interface is coupled to the packaging ingest device and is configured to receive a transcoded stream of media from the network interface for transmission to the packaging ingest device, and wherein the operations further comprise:

receiving an indication that the packaging ingest device has failed;

selecting a second packaging ingest device from the pool of backup packaging ingest devices to serve as a backup for the packaging ingest device; and coupling the second network interface to the second packaging ingest device instead of the packaging ingest device such that the second network interface is configured to transmit the transcoded stream of media to the second packaging ingest device.

\* \* \* \* \*